US006859891B2

(12) United States Patent
Edwards et al.

(10) Patent No.: US 6,859,891 B2
(45) Date of Patent: Feb. 22, 2005

(54) APPARATUS AND METHOD FOR SHADOWING PROCESSOR INFORMATION

(75) Inventors: David Alan Edwards, Bristol (GB); Margaret Rose Gearty, Bath (GB); Bernard Ramanadin, Palo Alto, CA (US); Anthony Willis Rich, Cambridge (NZ)

(73) Assignee: STMicroelectronics Limited (GB)

( * ) Notice: Subject to any disclaimer, the term of this patent is extended or adjusted under 35 U.S.C. 154(b) by 0 days.

(21) Appl. No.: 09/410,606

(22) Filed: Oct. 1, 1999

(65) Prior Publication Data

US 2003/0115506 A1 Jun. 19, 2003

(51) Int. Cl.[7] .................................................. G06F 11/00
(52) U.S. Cl. ............................ 714/30; 714/31; 714/38; 714/45
(58) Field of Search .............................. 714/30, 31, 38, 714/45

(56) References Cited

U.S. PATENT DOCUMENTS

| | | | |
|---|---|---|---|
| 4,814,981 A | 3/1989 | Rubinfeld | 364/200 |
| 5,251,311 A | 10/1993 | Kasai | 395/425 |
| 5,289,587 A | * 2/1994 | Razban | 703/28 |
| 5,386,565 A | 1/1995 | Tanaka et al. | 395/700 |
| 5,423,050 A | 6/1995 | Taylor et al. | 395/575 |
| 5,434,804 A | 7/1995 | Bock et al. | 364/579 |
| 5,440,705 A | 8/1995 | Wang et al. | 395/421.1 |
| 5,448,576 A | 9/1995 | Russell | 371/22.3 |
| 5,452,432 A | 9/1995 | Macachor | 395/425 |
| 5,455,936 A | 10/1995 | Maemura | 395/183.11 |
| 5,479,652 A | 12/1995 | Dreyer et al. | 395/183.06 |
| 5,483,518 A | 1/1996 | Whetsel | 370/13 |
| 5,488,688 A | 1/1996 | Gonzales et al. | 395/183.1 |

(List continued on next page.)

FOREIGN PATENT DOCUMENTS

| | | |
|---|---|---|
| EP | 0165 600 B1 | 12/1985 |
| EP | 0 165 600 A2 | 12/1985 |
| EP | 0 636 976 B1 | 2/1995 |
| EP | 0 636 976 S1 | 2/1995 |
| EP | 0 652 516 A1 | 5/1995 |
| EP | 0702 239 A3 | 3/1996 |
| EP | 0 702 239 A2 | 3/1996 |
| EP | 0 720 092 A1 | 7/1996 |
| EP | 0 933 926 A1 | 8/1999 |
| EP | 0 945 805 A1 | 9/1999 |
| EP | 0 959 411 A1 | 11/1999 |
| JP | 8320796 A | 12/1996 |
| JP | 8329687 A | 12/1996 |
| JP | 9212358 A | 8/1997 |
| JP | 9311786 A | 12/1997 |
| JP | 10106269 A | 4/1998 |
| JP | 101244884 A | 5/1998 |
| JP | 10177520 A | 6/1998 |
| WO | WO98/13759 | 4/1998 |

OTHER PUBLICATIONS

York, Richard et al. "Real Time Debug for System–on–Chip Devices", Jun., 1999.

Primary Examiner—Robert Beausoliel
Assistant Examiner—Michael Maskulinski
(74) Attorney, Agent, or Firm—Lisa K. Jorgenson; James H. Morris (57) ABSTRACT

An microcomputer is provided including a processor and a debug circuit including a dedicated link which transfers information between the processor and debug circuit to support debugging operations. In one aspect, the processor provides program counter information, which is stored in a memory-mapped register of the debug circuit. The program counter information may be a value of the processor program counter at a writeback stage of a processor pipeline. Also, trace information including message information is transferred in a non-intrusive manner over the dedicated link. In one aspect, the microcomputer is implemented as a single integrated circuit.

21 Claims, 6 Drawing Sheets

U.S. PATENT DOCUMENTS

| | | | |
|---|---|---|---|
| 5,493,723 A * | 2/1996 | Beck et al. | 703/28 |
| 5,530,965 A | 6/1996 | Kawasaki et al. | 395/800 |
| 5,570,375 A | 10/1996 | Tsai et al. | 371/22.3 |
| 5,590,354 A | 12/1996 | Klapproth et al. | 395/800 |
| 5,596,734 A | 1/1997 | Ferra | 395/825 |
| 5,598,551 A | 1/1997 | Barajas et al. | 395/484 |
| 5,606,566 A | 2/1997 | Whetsel | 371/22.3 |
| 5,608,881 A | 3/1997 | Masumura et al. | 395/306 |
| 5,613,153 A | 3/1997 | Arimilli et al. | 395/821 |
| 5,627,842 A | 5/1997 | Brown et al. | 371/22.3 |
| 5,642,479 A * | 6/1997 | Flynn | 714/45 |
| 5,657,273 A | 8/1997 | Ayukawa et al. | 365/189.01 |
| 5,682,545 A | 10/1997 | Kawasaki et al. | 395/800 |
| 5,704,034 A * | 12/1997 | Circello | 714/38 |
| 5,708,773 A | 1/1998 | Jeppesen, III et al. | 395/183.06 |
| 5,724,549 A | 3/1998 | Selgas et al. | 395/468 |
| 5,737,516 A | 4/1998 | Circello et al. | 395/183.14 |
| 5,751,621 A | 5/1998 | Arakawa | 364/748.07 |
| 5,768,152 A | 6/1998 | Battaline et al. | 364/551.01 |
| 5,771,240 A | 6/1998 | Tobin et al. | 371/22.1 |
| 5,774,701 A | 6/1998 | Matsui et al. | 395/556 |
| 5,778,237 A | 7/1998 | Yamamoto et al. | 395/750.04 |
| 5,781,558 A | 7/1998 | Inglis et al. | 371/21.1 |
| 5,796,978 A | 8/1998 | Yoshioka et al. | 395/416 |
| 5,828,824 A * | 10/1998 | Swoboda | 714/25 |
| 5,828,825 A | 10/1998 | Eskandari et al. | 395/183.03 |
| 5,832,248 A | 11/1998 | Kishi et al. | 395/376 |
| 5,835,963 A | 11/1998 | Yoshioka et al. | 711/207 |
| 5,848,247 A | 12/1998 | Matsui et al. | 395/284 |
| 5,860,127 A | 1/1999 | Shimazaki et al. | 711/167 |
| 5,862,371 A * | 1/1999 | Levine et al. | 712/228 |
| 5,862,387 A | 1/1999 | Songer et al. | 395/728 |
| 5,867,726 A | 2/1999 | Ohsuga et al. | 395/800.32 |
| 5,884,092 A | 3/1999 | Kiuchi et al. | 395/800.35 |
| 5,896,550 A | 4/1999 | Wehunt et al. | 395/846 |
| 5,918,045 A | 6/1999 | Nishii et al. | 395/584 |
| 5,930,523 A | 7/1999 | Kawasaki et al. | 395/800.32 |
| 5,930,833 A | 7/1999 | Yoshioka et al. | 711/210 |
| 5,944,841 A | 8/1999 | Christie | 714/38 |
| 5,950,012 A | 9/1999 | Shiell et al. | 395/712 |
| 5,953,538 A | 9/1999 | Duncan et al. | 395/842 |
| 5,956,477 A | 9/1999 | Ranson et al. | 395/183.06 |
| 5,978,874 A | 11/1999 | Singhal et al. | 710/107 |
| 5,978,902 A | 11/1999 | Mann | 712/227 |
| 5,978,937 A * | 11/1999 | Miyamori et al. | 714/45 |
| 5,983,017 A | 11/1999 | Kemp et al. | 395/704 |
| 5,983,379 A | 11/1999 | Warren | 714/727 |
| 6,058,393 A * | 5/2000 | Meier et al. | 714/38 |
| 6,314,530 B1 * | 11/2001 | Mann | 714/25 |
| 6,397,354 B1 * | 5/2002 | Ertekin | 714/34 |
| 6,516,428 B2 * | 2/2003 | Wenzel et al. | 714/28 |
| 6,539,500 B1 * | 3/2003 | Kahle et al. | 714/45 |

* cited by examiner

APPARATUS AND METHOD FOR SHADOWING PROCESSOR INFORMATION

BACKGROUND OF THE INVENTION

1. Field of the Invention

The invention relates generally to debugging processors, and more specifically, to shadowing processor information for debugging purposes.

2. Related Art

System-on-chip devices (SOCs) are well-known. These devices generally include a processor, one or more modules, bus interfaces, memory devices, and one or more system busses for communicating information. Because multiple modules and their communications occur internally to the chip, access to this information is generally difficult when problems occur in software or hardware. Thus, debugging on these systems is not straightforward. As a result of development of these SOCs, specialized debugging systems have been developed to monitor performance and trace information on the chip. Such systems typically include dedicated hardware or software such as a debug tool and debug software which accesses a processor through serial communications.

However, debugging an SOC generally involves intrusively monitoring one or more processor registers or memory locations. Accesses to memory locations are sometimes destructive, and a data access to a location being read from a debugging tool may impede processor performance. Similarly, accesses are generally performed over a system bus to the processor, memory, or other module, and may reduce available bandwidth over the system bus for performing general operations. Some debugging systems do not perform at the same clock speed as that of the processor, and it may be necessary to slow the performance of the processor to enable use of debugging features such as obtaining trace information. By slowing or pausing the processor, some types of errors may not be reproduced, and thus cannot be detected or corrected. Further, accurate information may not be available altogether due to a high speed of the processor; information may be skewed or missing.

Some systems include one or more dedicated functional units within the SOC that are dedicated to debugging the processor, sometimes referred to as a debug unit or module. However, these units affect the operation of the processor when obtaining information such as trace information. These devices typically function at a lower speed than the processor, and thus affect processor operations when they access processor data. The debug system relies upon running debug code on the target processor itself, and this code is usually built into the debugee. Thus, the presence of the debug code is intrusive in terms of memory layout, and instruction stream disruption.

Other debugging systems referred to as in-circuit emulators (ICEs) match on-chip hardware and are connected to it. Thus, on-chip connections are mapped onto the emulator and are accessible on the emulator. However, emulators are prohibitively expensive for some applications, and do not successfully match all on-chip speeds or communications. Thus, emulator systems are inadequate. Further, these systems generally transfer information over the system bus, and therefore necessarily impact processor performance.

Another technique for troubleshooting includes using a Logic State Analyzer (LSA) which is a device connected to pins of the integrated circuit that monitors the state of all off-chip communications. LSA devices are generally expensive devices, and do not allow access to pin information inside the chip. In sum, there are many systems which are inadequate for monitoring the internal states of a processor and for providing features such as real-time state and real-time trace in a non-intrusive manner.

SUMMARY OF THE INVENTION

These and other drawbacks of conventional debug systems are overcome by providing a dedicated link which operatively couples a processor and a debug circuit which transfers information between them to support debugging operations. In one aspect, the processor provides information that a debug trace tool would need to be performed non-intrusively, that is, without disturbing memory accesses or the execution pipeline of the processor. Also, in one aspect, information is transmitted from the processor at a rate that matches the processor internal clock speed.

In one aspect, the processor communicates over this link to a debug circuit. Further, this link coupling the processor and the debug circuit is utilized in a manner which minimizes a number of physical lines required to communicate the information. Further, information needed to perform trace operations is transferred in a non-intrusive manner over the link. In one aspect, the processor and debug circuit may be located on a single integrated circuit.

According to another aspect, the processor provides program counter information to the debug circuit. In another aspect, program counter information is stored in a register of the debug unit. The register may be memory-mapped such that systems on-chip and/or external systems may access program counter information without affecting processor performance. By shadowing program counter information in debug circuit and because the debug circuit is capable of serving information independently of the processor, processor performance is unaffected when program counter information is accessed by other systems. By providing program counter information, the debug circuit is capable of creating trace messages for debugging purposes.

According to one aspect of the invention, a signal indicating the program counter has incremented is sent program counter signals to the debug circuit to allow the circuit to track the program counter in the processor. Thus, transmission of the entire program counter is not necessary and the number of communication lines between the processor and debug circuit is minimized.

In yet another aspect, the system provides watchpoint circuits for determining one or more states of the processor and locates signals related to triggering the processor. The processor may be configured to transfer values of the processor states to the debug circuit over the dedicated link. In one aspect of the invention, the internal states of the processor are mapped to registers in the debug circuit whereas conventional systems generally need intrusive software to determine state of processor.

According to one aspect of the invention, the location of watchpoints are balanced between being located in processor and debug circuit; the interface is configured to minimize the number of lines to access the information. In one aspect, watchpoint circuits that relate to triggering in the processor are located in the processor. For example, watchpoint circuitry related to operand addresses, instruction values, and instruction addresses are located in the processor.

In another aspect of the invention, the processor provides process identification information to debug circuit which then can base/optimize filtering based on process identifier values in debug circuit. In one aspect, the process identification information is transferred over lines dedicated for trace data in order to minimize the number of communication lines. Further, process identification information may be shadowed in the debug circuit.

Further, the debug circuit may provide a stall control signal to stall the processor. Advantageously, trace information is preserved in situations when the debug circuit cannot accept additional trace information. Further, the processor may provide an indication that the processor has stalled. Also, the debug circuit may provide exception indication signals to indicate that an exception occurred in debug unit.

These and other advantages are provided by a microcomputer implemented on a single integrated circuit, the microcomputer comprising a processor; a debug circuit; a system bus coupling the processor and debug circuit; and a communication link coupling the processor and debug circuit, wherein the processor is configured to transmit to the debug circuit through the communication link a plurality of bit values each representing a state of an operation in the processor including at least one of: an operand address; an instruction address; and a performance status.

In one embodiment, at least one of the plurality of bit values represents a state of an operation in the processor including an instruction value. In another embodiment, the processor is further configured to transmit to the debug circuit a program counter value indicating the program counter of the processor. In another embodiment, the program counter has a value corresponding to a value of the program counter at the writeback stage of a pipeline of the processor.

The processor may be further configured transmit to the debug circuit a status indicating that a computer instruction in the writeback stage is a valid computer instruction. Further, the processor may be configured transmit to the debug circuit a status indicating that the computer instruction in the writeback stage is a first instruction past a branch instruction. The processor can be further configured transmit to the debug circuit a status indicating a type of an executed branch instruction.

In one embodiment, the debug circuit is configured to transmit a trace packet indicating the type of the executed branch instruction. According to another embodiment, the plurality of bit values representing a pre-execution state of the processor. In another embodiment, the processor is configured to suppress transmitting the plurality of bit values upon detecting an exception.

Also, in one embodiment, the processor is further configured transmit to the debug circuit address information of an executed instruction. The processor may be further configured transmit to the debug circuit data information of an executed instruction. Also, the processor may be further configured to the debug circuit process identifier information of an executed instruction. Also, the debug circuit may be capable of transmitting processor control signals, including at least one of: a signal to suspend operation of the processor; a signal to resume fetching instructions; a signal to reset the processor; and a signal to indicate that an exception has occurred in the debug unit.

According to one embodiment of the invention, at least one of the plurality of bit values represents a match state between a match value and a portion of an executed instruction. According to another embodiment, at least one of the plurality of bit values represents a match state between a match value and a memory address accessed by the processor in response to an executed instruction. The processor may be further configured to transmit to the debug circuit a value indicating an increment of the program counter of the processor. In one embodiment, the processor may be further configured to transmit to the debug circuit a value indicating a change in value of a process identifier.

In accordance with another aspect of the invention, a microcomputer implemented on a single integrated circuit is provided, the microcomputer comprising a processor; a debug circuit; a system bus coupling the processor and debug circuit; and a communication link coupling the processor and debug circuit, wherein the processor is configured to transmit to the debug circuit through the communication link a plurality of bit values each representing a state of an operation in the processor including at least one of an operand address; an instruction address; a performance status; and an instruction value; wherein the processor is further configured transmit to the debug circuit: a program counter value indicating the program counter of the processor at a writeback stage of a pipeline of the processor; a status indicating that a computer instruction is in the writeback stage is a valid computer instruction; a status indicating that the computer instruction in the writeback stage is a first instruction past an executed branch instruction; a status indicating a type of the executed branch instruction; and process identification information of an executed instruction.

According to another aspect of the invention, a microcomputer implemented on a single integrated circuit is provided that comprises a processor; a debug circuit; a system bus coupling the processor and debug circuit; and a communication link coupling the processor and debug circuit, wherein the processor is configured to transmit to the debug circuit through the communication link a program counter value indicating the program counter of the processor. The program counter may have a value corresponding to a value of the program counter at a writeback stage of a pipeline of the processor. Also, the processor can be further configured transmit to the debug circuit a status indicating that a computer instruction is in the writeback stage is a valid computer instruction. According to another embodiment, the processor is further configured to transmit to the debug circuit a status indicating that the computer instruction in the writeback stage is a first instruction past a branch instruction.

According to another embodiment, the processor is further configured to transmit to the debug circuit a value indicating an increment of the program counter of the processor. According to another embodiment, the processor is further configured to transmit to the debug circuit process identifier value. According to another embodiment, the processor is further configured to transmit to the debug circuit an signal indicating that a current process identifier value differs from a process identifier value of a previously-executed instruction. According to another embodiment, the debug circuit is configured to store the program counter of the processor in a memory-mapped register.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements.

In the drawings.

DETAILED DESCRIPTION

Figure 1:
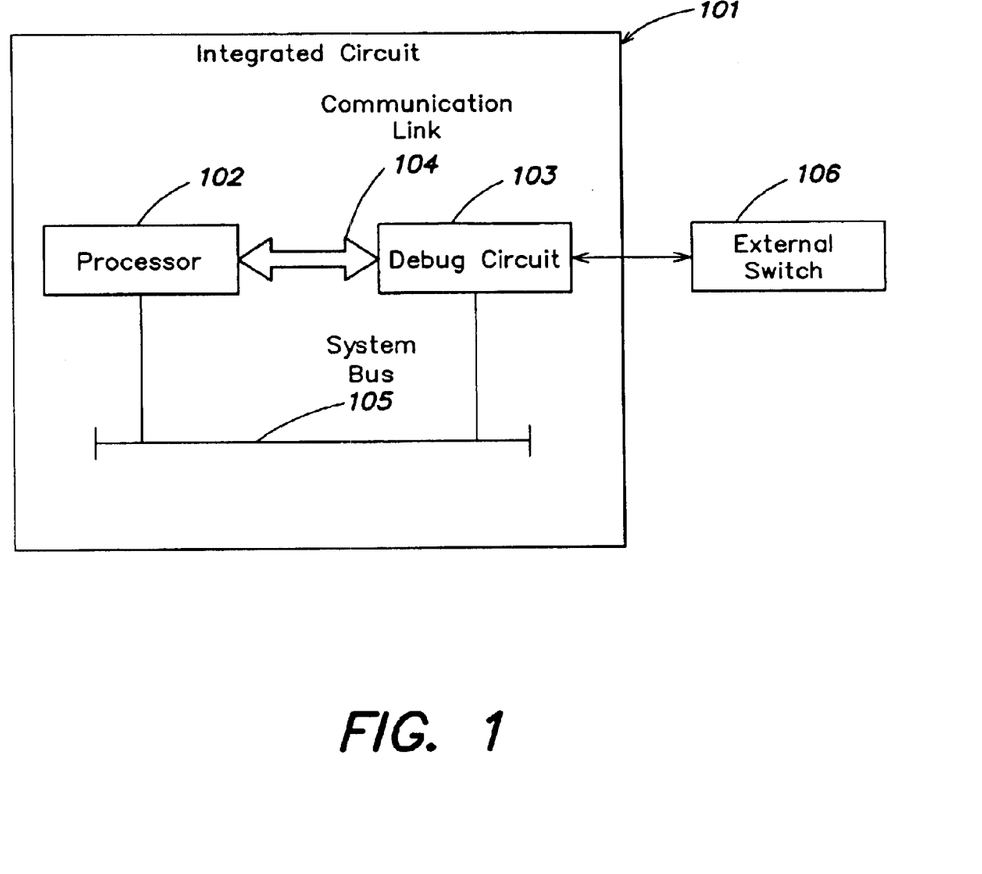
FIG. 1 is a block diagram of an integrated circuit in accordance with one embodiment of the invention.

One embodiment of the invention is described with particularity with respect to FIG. 1. FIG. 1 shows a block diagram of an integrated circuit device 101, or system-on-chip (SOC) mentioned above. This circuit may include a processor 102 and debug circuit 103 or module interconnected by a system bus 105. System bus 105 may be, for example, a conventional processor bus, packet switch, or other communication medium used to communicate operating information between modules of device 101. Operations such as reads, writes, swaps, and the like are typical operations that are performed between modules.

Processor 102 is a device which is adapted to read and execute one or more processor instructions, and to perform operations on data. Processor 102 may read data from a number of data sources (not shown), and write data to one or more data stores (not shown). These data sources and stores may include Random Access Memory (RAM), a computer hard disc accessible through a hard disc controller, storage accessible over one or more communication links, or any entity configured to provide or store data. These storage entities may be accessible directly on system bus 105 or may be accessible through an external communication link. Processor 102 may be a general purpose processor, such as a processor running in a general purpose computer system or may be a specialized processor adapted for a special purpose. It should be understood that any type of processor and any number of processors may be used.

Communication link 104 couples processor 102 to debug circuit 103, and is separate from system bus 105. Communication link 104 may be any media capable of transferring signals to processor 102 including, but not limited to, wires, optical links, or the like. Link 104 is configured to transfer debug information from processor 102 to debug circuit 103, and to transfer state and processor control information from the debug circuit 103 to processor 102. Also, there may be more than one processor 102 connected to debug circuit 103, through one or more dedicated links 104.

In one aspect of the invention, processor 102 provides program counter information to debug circuit 103 over link 104, and provides this information in a manner which does not affect processor 102 pipeline performance, memory access, or system bus 105 performance. A program counter is an identifier maintained by processor 102 used to uniquely identify an instruction being executed. Processor 102 generally uses a program counter in loading and executing instruments and is well-defined in the art.

Program counter information can be used by debug circuit 103 to formulate trace messages or can be used for other debugging purposes. Other types of information may be provided, including process identifier information, bit values representing a state of operation of the processor, and the like to support debugging operations.

Debug circuit 103 may communicate with an external system 106 to allow external system 106 to access debug information within integrated circuit 101. For example, debug circuit 103 may communicate with external system 106 in any manner, such as through a serial port, JTAG (defined by IEEE1149.1a-1993), or other interface. Debug circuit 103 or module may be a circuit or processor executing code that performs on-chip debugging functions. Generally, external system 106 is a general purpose computer such as an Intel-processor-based personal computer running Microsoft Windows operating system, or a Unix-based system (Intel is a registered trademark of the Intel Corporation; Microsoft and Windows are registered trademarks of the Microsoft Corporation). It should be understood that any computer or operating system may be used.

External system 106 generally runs a software program referred to in the art as a "software backplane" wherein debug tools operating on a software interface to this backplane access a target system to be debugged, such as integrated circuit 101. External system 106 may include external hardware including a processor in memory in order to access integrated circuit 101 in a high performance manner. A user generally interfaces with external system 106 to debug a software program which executes on processor 102. Alternately, external system 106 may be a hardware-only system (e.g. a logic analyzer) or may be a combination of software and hardware. It should be understood that external system 106 may be any entity that accesses information of circuit 101.

Figure 2:
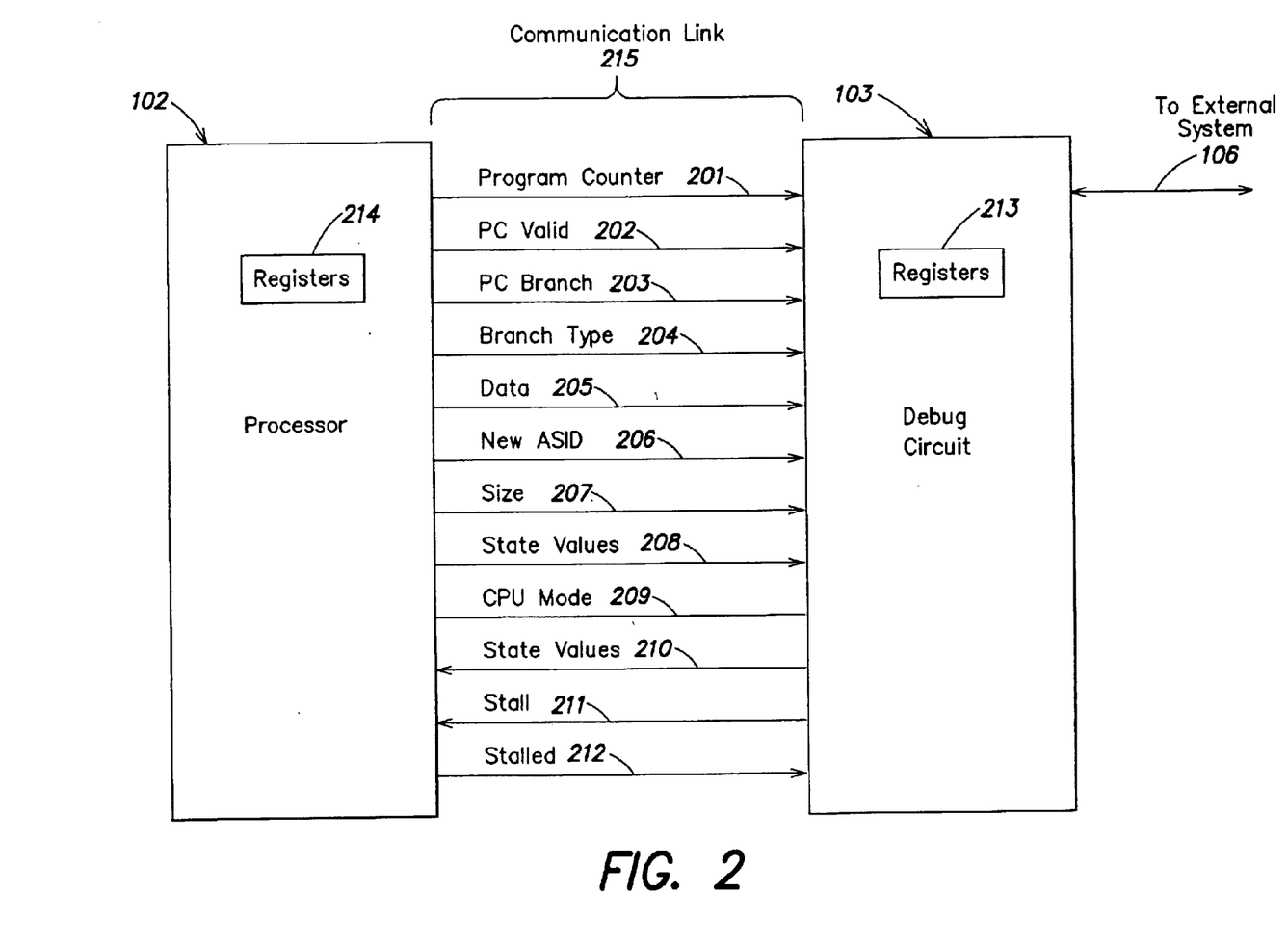
FIG. 2 is a block diagram showing a communication link in accordance with one embodiment of the invention.

FIG. 2 shows a communication link in accordance with one embodiment of the invention. Communication link 215 operatively couples processor 102 and debug circuit 103. Link 215 may directly couple processor 102 and circuit 103, or may be routed through one or more intervening circuits. Communication link 215 may connect one or more processors to debug circuit 103, or multiple links between debug circuit 103 and other processors may be implemented.

Processor 102 may be configured to transmit a program counter 201 to debug circuit 103, wherein debug circuit 103 will store the program counter in one or more registers 213. Program counter 201 may be, for example, a 32-bit value corresponding to the size of the program counter in processor 102. To support different debug features, it may be of benefit for processor 102 to provide debug circuit 103 with enough information to track the program counter during processor 102 operation.

Processor 102 also provides a PC valid 202 signal that indicates that the value of program counter 201 is valid. According to one embodiment, the PC valid signal 202 indicates that the program counter is a valid instruction in a writeback stage of the processor 102 pipeline. PC valid signal 202 may be a single bit value. Processor 102 also transmits a PC branch signal 203 which indicates that the program counter in the writeback stage is the first program counter after a branch. PC branch 203 may be a single bit value. Tracking of program counter ensures that a new program counter value is available at the point of the processor pipeline where the decision to definitely take a branch is available, such that when the processor indicates to the debug circuit a PC branch signal 203, the processor correctly detects the program counter, rather than the current pipeline program counter at the point of processor 102-debug circuit 103 communication.

Branch type 204 indicates a type of branch that has been recently executed. For example, the branch type 204 signal is asserted when the first instruction after the branch reaches a writeback stage of the pipeline. Branch types may include, a conditional branch, an unconditional branch, a return from exception (RTE) branch, and other types of branches including trap launch branches, interrupt launch branches, etc. as known in the art. Branch type 204 is useful when determining the location in software of an error, or providing branching information for coverage analysis tools, call graph profilers, trace analysis tools, or compiler feedback tools. For example, by providing a value of the program counter when the first instruction reaches the writeback stage and the branch type signal, external system 106 such as a tool has information needed to perform branch tracing. It may also be useful to know what types of branches have occurred, and their frequencies to evaluate performance of a software program. A debug circuit may also provide different debug information to an external system 106 based upon branch type 204.

Branch type 204, for example, may be a 2-bit value, the value "00" corresponding to conditional branches, "01" corresponding to unconditional branches "10" corresponding to RT branches, "11" corresponding to all other branches. It should be understood that other data sizes and codes may be used.

Data signal 205 may carry a number of different types of data to debug circuit 103. For example, data associated with a "store" instruction may be transferred to the debug circuit, or, a new ASID or process identifier value may be transmitted when the signal new ASID 206 indicates that a new ASID is on the data bus. Address Space Identifiers (ASIDs) are generally used to implement memory protection during multitasking with multiple virtual memory modes. Thus, each process has its own virtual memory (and unique ASID value) and is prevented from accessing the resources of another process or operating system kernel, as known in the art.

Using the data bus for different data types minimizes the number of wires necessary to implement communication link 215. Data signal may also carry operand address information and operand data. For example, data signal 205 may be a 64-bit value, 32 bits being used for operand address information, and 32-bits being used for operand data or simply 64 bits of data.

Size 207 is a signal which indicates the size of data exported to the debug circuit 103. Data size could be, for example, a 3-bit value. State values 208 may include one or more signals that indicate one or more states of processor 102. For example, a watchpoint channel may be defined in processor 102 which compares a register with a particular data value such as a data address accessed in memory of a computer, the address of a module located on the system bus 105, an address of an operand executed by the processor, or any other condition in the processor that can be matched by one or more predetermined values. Watchpoint channels include a matching mechanism whereby data values written to registers in processor 102 are compared with data values in processor 102 including instruction addresses, instruction values, operand addresses, performance counters, event counters, and the like.

When matched, a controller associated with the watchpoint channel may provide a signal to debug circuit 103 through communication link 215. This signal may take the form of state bits indicating particular watchpoint channel states within the processor 102 communicated in state values 208. Also, state bit values corresponding to watchpoint channels can be combined together to effect different debugging operations by debug circuit 103, and these state bit values may also be communicated.

In a similar manner, debug circuit 103 may provide a number of state values 210 to the processor for use in debugging operations. In particular, debug circuit 103 may provide a number of bit values which operate as preconditions to triggering particular events in the processor 102. These events may then generate trace information or other state information to be received by debug circuit 103.

Further, watchpoint channels may cause the processor 102 to generate a trace packet and, in some cases, generate an exception. The watchpoint channels themselves may also have preconditions which determine whether or not they will generate state information, match conditions which indicate whether or not a match will occur for a particular watchpoint, and action conditions which will determine if and what type of action occurs based on a watchpoint channel match.

As discussed above, a number of watchpoints may be defined in both the processor 102 and the debug circuit 103. These watchpoints may determine a state value stored in a data latch located in either processor 102 or debug circuit 103. An output of one data latch may serve as input to another latch (they may be "chained" together), or may function as a precondition for a watchpoint channel. These and other features of watchpoints and data latches are described more fully in co-pending U.S. patent application entitled MICROCOMPUTER DEBUG ARCHITECTURE AND METHOD, by D. Edwards, et al., filed Oct. 1, 1999, Attorney Docket Number 99-TK-263, incorporated herein by reference in its entirety.

Processor 102 may also transmit CPU mode 209 which indicates if the processor 102 is in user or supervisor mode. CPU mode 209 information may be used by debug circuit 103 as a precondition for triggering an event, such as the creation of a trace message, to limit the amount of trace messages generated.

Stall signal 211 indicates that the processor 102 should stall its execution pipeline. Stalled signal 212 indicates to the debug circuit 103 that the pipeline has stalled. These indications 211, 212 are useful in performing flow control between processor 102 and debug circuit 103. For example, processor 103 may be generating trace information beyond storage capability of debug circuit 103 and indicates to the processor 102 to stall its execution pipeline such that additional trace information cannot be generated. Debug circuit 103 may, for example, stall processor 102 when a trace buffer is within a certain number of entries before it is filled. Thus, debug circuit 103 can avoid losing trace information. Stall signal 211 and stalled signal 212 may each be one bit values.

Debug circuit 103 may also be configured to transmit information received over communication link 215 to an external system 106. Such information may include trace information, timing information, a value of the program counter and the like for debugging purposes. For example, trace messages may be generated based on different watchpoint hits, and these trace messages may contain information values received through a debug circuit-processor communication link such as links 104, 215, 313, 522 shown in FIGS. 1–3 and 5.

Figure 3:
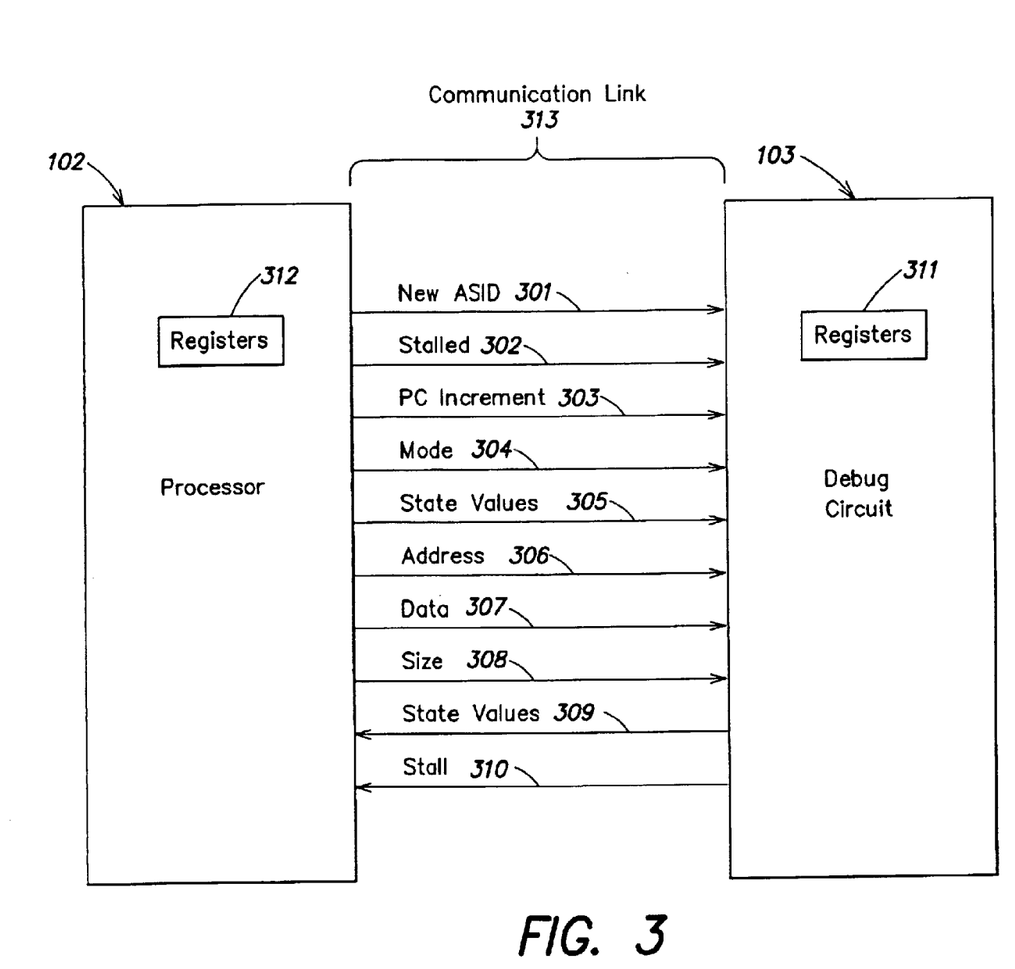
FIG. 3 is a block diagram showing a communication link in accordance with another embodiment of the invention.

FIG. 3 shows another communication link 313 in accordance with an embodiment of the invention. In this embodiment, a number of communication lines could be reduced further by sending an increment signal instead a full data value of the program counter to debug circuit 103. Communication link 313 may include, for example, a PC increment signal 303 which indicates that the program counter in the processor has incremented. Debug circuit 103 may, for example, include a register 311 which stores the current value of the program counter in the processor 102, and, in response to the PC increment signal 303, the debug circuit 103 increments the value of the program counter in the register.

Communication link 313 may also include a facility to transfer the value of the program counter when the program counter in the processor changes in a non-sequential manner, such as during the execution of a branch instruction. For example, communication link 313 may also include a mode signal 304 which indicates that the program counter is incremented non-sequentially, that is, the program counter has changed by more than a positive one value. Mode signal 304 may also indicate an amount by which the program counter has changed. According to one embodiment, processor 102 may execute both 16-bit and 32-bit instructions, and may execute these instructions in a manner which effects the program counter in a different manner, such as by incrementing the program counter non-sequentially. Thus, processor 102 may need to indicate which processing mode processor 102 is in, such that the debug circuit 103 may accurately maintain the program counter in register 311. More specifically, one embodiment may use the mode signal 304 in conjunction with increment signal 303 so that the address counter is incremented by an amount according to the size of the instruction. For example, a mode signal 304 value of '1' may indicate that an instruction executed is a 32-bit instruction, and a value of '0' indicates that a 16-bit instruction was executed. It should be understood that any size information could be communicated to indicate a size of an executed instruction. Thus, the value of the program counter stored in debug circuit 103 accurately maintained even if variable length instructions are used.

Generally, program counter information is useful only if the information is accurate. For example, branch trace information generally includes program counter information prior to and after the branch occurs. If the program counter information is incorrect, the branch trace information collected is meaningless. Another application where accurate program counter information is needed is for analyzing trace information with trace analysis tools. Trace packets are used by trace analysis tools executing on external system 106 to determine the source and destination of branches. Further, a trace system may include a print function which generates a trace packet whenever a particular state is encountered in the processor. The trace messages generated by the print function may include the current program counter and a data value which has been written by the processor. This function may be used by instrumenting specific routines in a user's application or by a real time operating system (RTOS) by embedding the print function at various points in the program. The program counter value can be used by the software tools executing on external system 106 to determine which routine in program generated the trace packet, and thus the software tools can interpret the data value as being associated with a routing that caused the trace packet. In sum, accurate program counter information has many uses in debugging.

Communication link 313 may also carry state value information 305, 309, stalled 302, stall 310, data 307, size 308, and new ASID 301 signals similar in form and function to those shown and described above with respect to FIG. 2. It should be understood that other signals may also be transferred in link 313 to facilitate processor 103 and debug circuit 103 communication.

As discussed above with reference to FIGS. 2 and 3, program counter and ASID information may be "shadowed" in one or more debug registers 213. Shadowing may involve storing, remote in a remote location from processor 102, values of the program counter and ASID. The following chart shows various aspects of one embodiment of a register named DM.PC that holds program counter and ASID information.

TABLE 35

Example DM.PC Register

| DM.PC | | | | 0x100020 | |
|---|---|---|---|---|---|
| Field | Bits | Size | Volatile ? | Synopsis | Type |
| shadow_pc | [0, 31] | 32 | Yes | Program counter (PC) | RO (read only) |
| | Operation | | | The Debug Module maintains a shadow program counter which is kept in step with the program counter of the processor by means of PC increment and new-PC-value transfers sent over a communication link connecting the watchpoint controller to the debug circuit. | |
| | When read | | | Returns the current value of the shadowed program counter. Reads do not affect the increment or update-new-value functions of this counter. | |
| | When written | | | Ignored | |
| | HARD reset | | | Undefined | |
| shadow_asid | [32,39] | 8 | Yes | Address Space ID | RO (read only) |
| | Operation | | | The debug circuit maintains a shadow ASID register which is kept in step with the ASID register of the processor by means of new-ASID-value transfers sent over the communication link connecting the watchpoint controller to the debug circuit. | |
| | When read | | | Returns the current value of the shadow ASID register. Reads do not affect the update-new-value functions of this register. | |
| | When written | | | Ignored | |
| | HARD reset | | | Undefined | |
| — | [40, 63] | 24 | — | RE-SERVED | RES |
| | Operation | | | RESERVED | |
| | When read | | | Returns 0 | |
| | When written | | | Ignored | |
| | HARD reset | | | 0 | |

Figure 4:
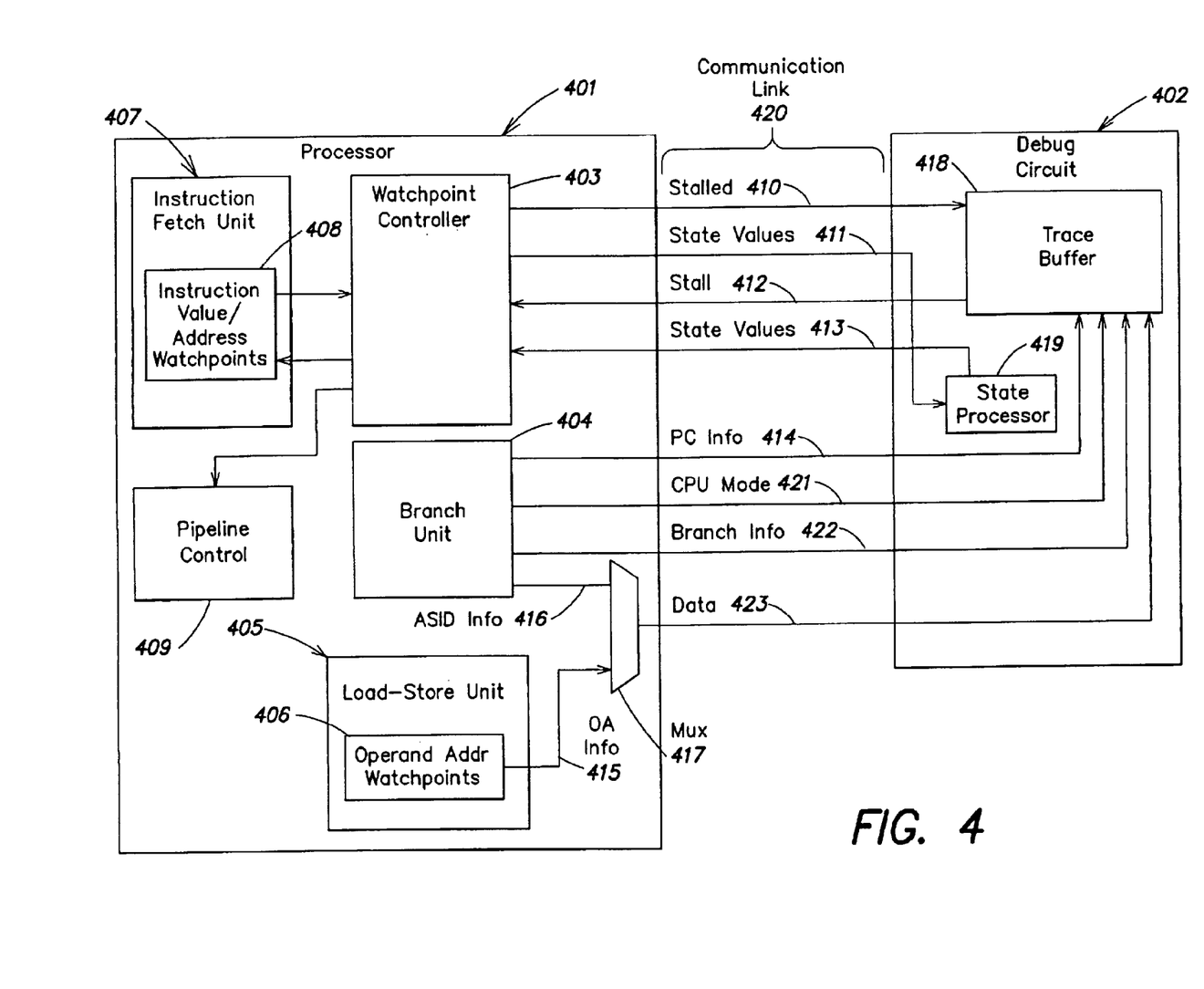
FIG. 4 is a block diagram of a system in accordance with one embodiment of the invention.

FIG. 4 shows a more detailed diagram of a communication link 420 in accordance with another embodiment of the invention. Processor 401, similar in function to processor 102, includes a watchpoint controller which accepts state information from an instruction fetch unit 407 functions fetching instructions from memory, performing decode of instructions, resolving interdependencies between instructions, among other coordinating operations. Fetch unit 407 may also include instruction value and address watchpoints 408.

Further, processor 401 includes a watchpoint controller 403 that provides control information to a pipeline control unit 409 in order to stall and start an execution pipeline of processor 401. The watchpoint controller 403 may also keep track of watchpoint channel information in processor 401, and provide such information to circuit 402. Processor 401 also includes a branch unit 404 that handles branch-related instructions in processor 401, resolves/predicts branch addresses, and other branch-related functions. Branch unit 404 provides signals program counter information 414, CPU mode information 421, and branch information 422. Branch unit 404 also provides process identifier or ASID information 416. Processor 401 also includes a load-store unit 405 which is responsible for performing execution functions. Load-store unit 405 includes operand address (OA) watchpoints 406, which produce operand address information 415.

ASID information 416 and operand address (OA) information 415 are fed through multiplexer 417 and transmitted to debug circuit 402 via data line 423. In one aspect of the invention, it is understood that when new ASID information 416 is available, no operand address information 415 will be available concurrently. Thus, the number of communication lines in communication link 420 are reduced because both ASID information 416 and OA information 415 are transmitted alternately over the same communication lines.

Debug circuit 402 may include a trace buffer 418 to receive trace information produced by processor 401. Trace buffer may be, for example, a storage unit configured to receive and store information from processor 401. Trace buffer 408 may include control circuitry which detects whether trace buffer 418 can accept additional trace information from processor 401. If not, trace buffer may provide a stall indication 412 to watchpoint controller 403 which may, in turn, cause pipeline control 409 to stall the execution pipeline. When trace buffer 418 can accept additional trace information, trace buffer 418 may assert a different signal on stall 412 to indicate that buffer 418 can accept additional information. In another aspect, trace buffer operates in a mode whereby additional trace information is discarded if buffer 418 cannot accommodate additional trace information. Alternatively, buffer 418 can discard the oldest trace information first. Debug circuit 402 may also format trace messages into messages, which can be stored on chip (such as in the trace buffer 418) or spilled to memory or to an external communication port.

Debug circuit 402 may also include a state processor 419 which accepts state information from processor 401 such as watchpoint information from watchpoint controller 403, or operand address watchpoints from load store unit 405. State processor 419 may use the received state information as preconditions for watchpoints located in debug circuit 402. In a similar manner, state processor 419 may provide state values 413 to processor 401.

Table 1 below shows yet another embodiment of link signals according to one aspect of the invention shown with respect to FIG. 5:

TABLE 1

External Interfaces of the Processor

| Bus | Dir | Src/Dest | Size | Description |
|---|---|---|---|---|
| Debug Interface | | | | |
| dm_p_stall | in | Debug circuit | 1 | Debug circuit cannot accept any more trace packets and indicates to the processor that it should stall its pipeline to prevent |

TABLE 1-continued

External Interfaces of the Processor

| Bus | Dir | Src/Dest | Size | Description |
|---|---|---|---|---|
| | | | | generation of further trace packets. |
| p_dm_stalled | out | Debug circuit | 1 | The processor is successfully stalled. |
| p_dm_pc | out | Debug circuit | 32 | Program counter (PC) of the instruction currently in the writeback stage. |
| p_dm_pc_valid | out | Debug circuit | 1 | The PC on the p_dm_pc bus is valid. Indicates a valid instruction in writeback. |
| p_dm_newpc | out | Debug circuit | 1 | Indicates the PC in writeback is the first PC just after a branch. |

Figure 5:
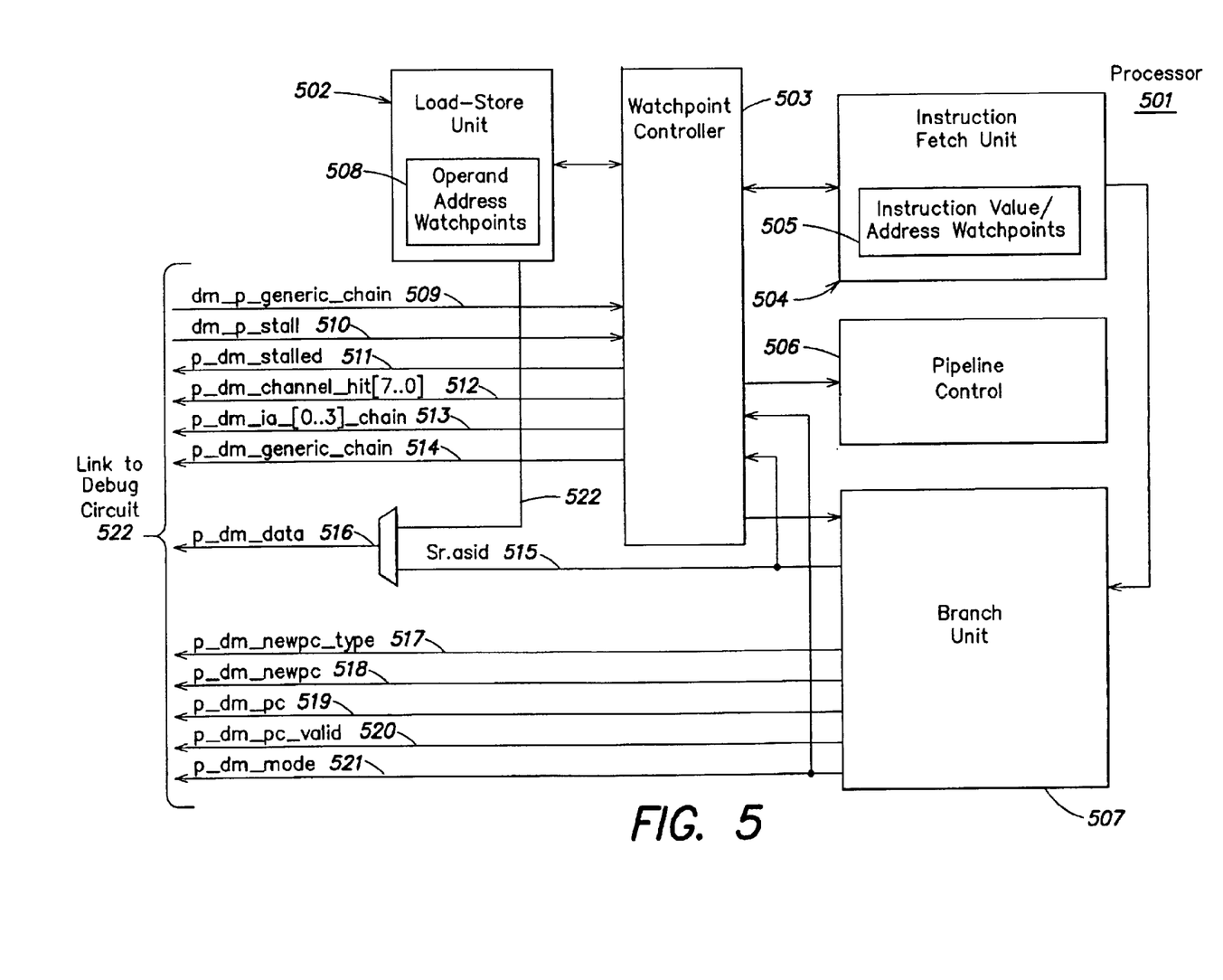
FIG. 5 is a block diagram of a system in accordance with another embodiment of the invention.

FIG. 5 shows a detailed block diagram of a processor 501 in accordance with one embodiment of the invention. Processor 501 includes a load store unit 502 having an operand address watchpoints 508, a watchpoint controller 503, an instruction fetch unit 504 having instruction value/address watchpoints 505, a pipeline control unit 506, and a branch unit 507 similar in functions to those described above with reference to FIG. 4.

Processor 501 includes a link 522 to a debug circuit that includes a number of signals transmitted and received by one or more modules of the processor. Branch unit 507 supplies the debug circuit with program counter information over a data bus named p_dm_pc 519 which may be a dedicated 32-bit bus carrying the program counter to the debug circuit. Data bus 519 is driven with the value of the program counter at the writeback stage of the processor pipeline.

Branch unit 507 may also provide a p_dm_pc_valid signal 520 which indicates that a valid instruction is in writeback. Unit 507 may also provide a signal named p_dm_newpc 518 which indicates that the instruction in writeback is the first instruction past a branch is performed. Further, a signal p_dm_newpc_type 517 is provided which indicates the type of branch which has just taken place. The signal p_dm_mode signal 521 indicates the mode of the processor during execution at the program counter value. Control signals 517 and 518 are provided to allow the debug circuit to properly perform branch trace filtering. When p_dm_newpc is asserted, the debug circuit knows that a branch has just occurred and can generate a trace packet accordingly.

A bit in an action register of each watchpoint channel may indicate whether or not an exception should be taken when there is a watchpoint hit. When an exception is detected, the watchpoint controller 503 may suppress watchpoint hidden information going to the debug circuit on p_dm_channel_hit [7 . . . 0] 512. Information is suppressed because the instruction is no longer valid; there is no associated valid program counter and additionally only partial trace information will be available as information regarding the instruction execution is discarded as soon as the exception is detected.

Trace information is passed to the debug circuit during a writeback stage of an instruction. The trace information may include program counter information as discussed above, channel hit information, and data and operand address information. Watchpoint controller 503 may provide channel hit information as an 8-bit vector, p_dm_channel_hit [7 . . . 0] 512 which indicates which watchpoint channels have matched and produced a channel hit. The debug circuit may interpret these channel hits to generate an appropriate trace message matching the type of watchpoint hit generated. Because watchpoint channel hit information is transferred as a multiple-bit vector, several watchpoint hits may occur for the same executed instruction.

Data and operand address information may be provided on a 64-bit data bus (p_dm_data 516) which can hold address and/or data information as follows:

TABLE 2

Watchpoint trace information (no exception)

| Channel | p_dm_data[63 . . . 32] (high) | p_dm_data (low) |
|---|---|---|
| IA | Not valid. | Not valid. |
| IV Instruction = store/swap | Data to be stored. | |
| IV Instruction not = store/swap | Invalid | |
| OA (oa_trace_data) = '1' Instruction = store/swap | Data to be stored. | |
| OA (oa_trace_data) = '1' Instruction = store/swap | Data to be stored (32 bits). | Address location where data is to be stored. |

For example, if there is an instruction value (IV) watchpoint hit and an operand address (OA) watchpoint hit with an oa_trace_data selecting address, an IV watchpoint can send the entire data. If there is an OA watchpoint as well, the load store unit 502 may drive data bus 516 with information produced by the OA watchpoint channel. Thus, it is possible to have an IV watchpoint hit which produces only half of the data on data bus 516, and the remainder of data bus 516 is used to transfer information produced from the OA watchpoint channel hit. Therefore, the number of data lines between processor 501 and a debug circuit are reduced.

Because a new branch target address is sent after a writeback stage (post-execution), and watchpoint channels may be triggered in pre-execution stages of the processor pipeline, it is possible to have a watchpoint hit at the same point new branch information is being sent. For example, to have an OA watchpoint on a load which is just after a branch, there will be an operand address associated with the load instruction, and the program counter associated with the branch instruction. In this case, the p_dm_data 516 will contain the address of the load instruction and the OA address will go on the upper half of p_dm_data bus 516.

As discussed above with reference to FIGS. 2–4, a processor may accept stall control signals and provide an indication of stalling to a debug circuit. Processor 501 accepts a control signal dm_p_stall 510 from a debug circuit that allows the debug circuit to stall an execution pipeline of processor 501. Watchpoint controller 503 provides the indication to pipeline control unit 506. In turn, processor 501 may provide an indication that the pipeline is stalled as signal p_dm_stalled 511.

Processor 501 may also include state indicators discussed above with respect to watchpoints referred to as "chain latches" which are data latches that can be chained together such that the output of one data latch may determine the state of another data latch. Further, these data latches could be located in a debug circuit or processor 501. These data latches may be set when watchpoint matches occur. Thus, processor 501 may produce and accept signals indicating the state of one or more data latches as signals dm_p_generic_chain 509 or p_dm_generic_chain 514.

Further, branch unit 507 may provide ASID information Sr.asid 515 every time that there is an ASID update. In one embodiment of the invention, sr.asid signal 515 is multiplexed with operand address watchpoint information 522 to produce p_dm_data 516. In one embodiment, there can be no clash between the transmission of ASID information and other trace data, because ASID updates occur after a return from exception (RTE) instruction reaches the writeback stage of execution. Because the RTE instruction is a back-serialized instruction, there will be no instructions in the pipeline until after the RTE instruction has completed.

Figure 6:
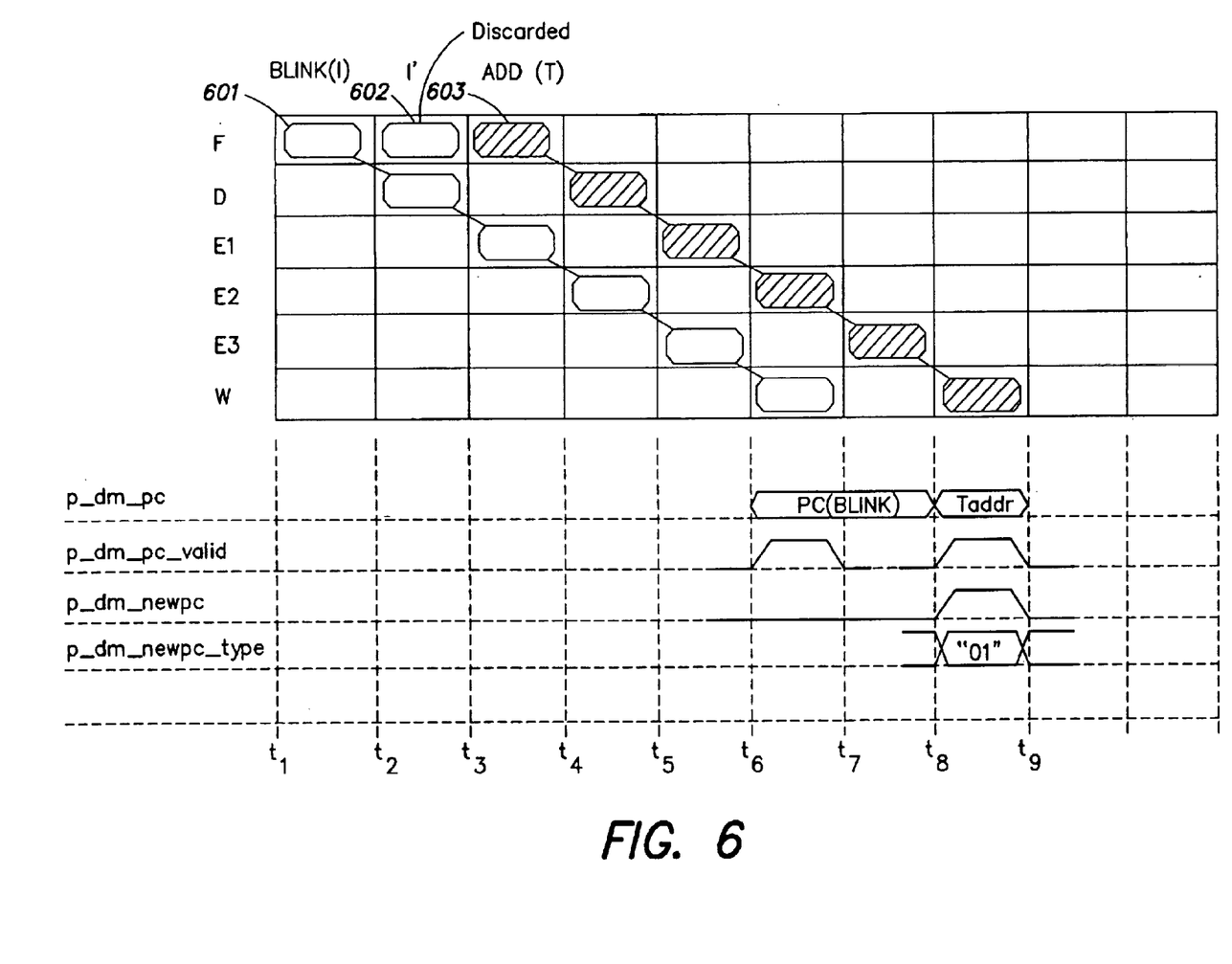
FIG. 6 is a timing diagram showing transmission of trace information in accordance with one embodiment of the invention.

BLINK is an example of a branch instruction. FIG. 6 shows a branch instruction (in this case a BLINK instruction) flowing through the processor pipeline with some other instruction, and the effect on the output of the communication link as shown in FIG. 5.

A processor may have many stages, and FIG. 6 shows a timing diagram of a processor having a six-stage pipeline. Pipeline stages are well-known in the art, and are steps involved in processing an instruction in a processor. Generally, specific functions are performed at each discrete stage in the processor pipeline. It should be understood that any number of pipeline stages may be used. The pipeline of processor 501 has the following six stages:

(1) Fetch (F);
(2) Decode (D);
(3) Execution stage (E1), (4) Execute stage E2, and (5) Execute stage (E5); and
(6) Writeback (W).

Item 601 in FIG. 6 indicates that the BLINK instruction has been fetched at time $t_1$ such as by a fetch unit from a memory location in fetch stage (F). Item 602 is an instruction at the memory address immediately following the BLINK instruction 601. This instruction is discarded in the fetch unit as the BLINK instruction is a branch instruction that causes the processor 501 to branch to a new address (the "target" address"). The instruction following the BLINK will not be executed by processor 501. Item 603 (shaded) represents a fetching of an ADD instruction (ADD(T)) at time $t_3$. The ADD(T) instruction is the first instruction past the branch, that is, the first instruction located at the target address that the processor will execute. The BLINK 601 and ADD(T) 603 instructions will propagate through the pipeline to the writeback stage (the W row).

The BLINK instruction reaches the writeback stage (W) first at time $t_6$. The address of the BLINK instruction is placed onto p_dm_pc 519 (as per execution of non-branch instructions). Signal p_dm_pc_valid 520 is asserted to show that a valid instruction is in writeback. Signal p_dm_newpc 518 is not asserted; p_dm_newpc 518 is asserted when the first instruction past a branch is in writeback. Signal p_dm_newpc_type 517 is ignored as no branch is taking place yet.

At time $t_7$, the branch unit 507 maintains the same PC value of signal p_dm_pc 519. As a branch is now in progress, no instruction is currently being executed. That is, because the instruction following the BLINK instruction 601 was discarded, the new instruction (ADD(T) instruction 603) located at the target address is fetched which causes a bubble in the processor pipeline. Thus, signal p_dm_pc_valid 520 is deasserted as no instruction is in the writeback stage.

At time $t_8$, the branch has taken place, and the writeback of the first instruction (ADD(T) 603) at the new target address occurs. Therefore, the ADD(T) instruction is reaching writeback, thus its address is placed onto p_dm_pc 519. Signal p_dm_pc_valid is asserted to show that a valid instruction is in writeback. The signal p_dm_newpc is asserted as the ADD(T) 603 is the first instruction past a branch, in other words, ADD(T) instruction 603 is the first instruction at the target address of the previous branch. Signal p_dm_newpc_type 517 indicates a signal value of 0×01 to show that the type of branch taken was a BLINK instruction. It should be understood that other types of instructions may be used.

While various embodiments of the present invention have been described above, it should be understood that they have been presented by way of example only, and not limitation. Thus, the breadth and scope of the present invention are not limited by any of the above exemplary embodiments, but are defined only in accordance with the following claims and their equivalents.

What is claimed is:

1. A microcomputer comprising:
   at least one processor;
   a debug circuit, wherein the at least one processor and debug circuit are implemented on a same integrated circuit;
   a system bus coupling the at least one processor and debug circuit;
   a communication link coupling the at least one processor and debug circuit, wherein the at least one processor is configured to transmit to the debug circuit through the communication link in real time, a program counter value indicating the program counter of the at least one processor;
   wherein the program counter value has a value corresponding to a value of the program counter at a writeback stage of a pipeline of the at least one processor; and
   wherein the at least one processor is further configured to transmit to the debug circuit through the communication link a status signal indicating that a computer instruction in the writeback stage is a valid computer instruction, the status signal comprising at least one bit.

2. The microcomputer according to claim 1, wherein the at least one processor is further configured to transmit to the debug circuit a status indicating that the computer instruction in the writeback stage is a first instruction past a branch instruction.

3. The microcomputer according to claim 1, wherein the at least one processor is further configured to transmit to the debug circuit a process identifier value.

4. The microcomputer according to claim 1, wherein the at least one processor is further configured to transmit to the debug circuit a signal indicating that a current process identifier value differs from a process identifier value of a previously-executed instruction.

5. The microcomputer according to claim 1, wherein the debug circuit is configured to store the program counter of the at least one processor in a memory-mapped register.

6. The microcomputer according to claim 5, wherein the debug circuit includes the memory-mapped register.

7. The microcomputer according to claim 1, wherein the at least one processor is further configured to transmit to the debug circuit a value indicating the program counter of the at least one processor has incremented; and
   wherein the at least one processor is further configured to transmit to the debug circuit a value indicating an amount by which the program counter is incremented.

8. A microcomputer comprising:
   at least one processor;
   a debug circuit, wherein the at least one processor and debug circuit are implemented on a same integrated circuit;
   a system bus coupling the at least one processor and debug circuit;
   means for transmitting to the debug circuit in real time, a program counter value indicating the program counter of the at least one processor;
   wherein the program counter value has a value corresponding to a value of the program counter at a writeback stage of a pipeline of the at least one processor; and
   wherein the at least one processor includes means for transmitting to the debug circuit a status signal indicating that a computer instruction in the writeback stage is a valid computer instruction, the status signal comprising at least one bit.

9. The microcomputer according to claim 8, wherein the at least one processor includes means for transmitting to the debug circuit a status indicating that the computer instruction in the writeback stage is a first instruction past a branch instruction.

10. The microcomputer according to claim 8, wherein the at least one processor includes means for transmitting to the debug circuit a process identifier value.

11. The microcomputer according to claim 8, wherein the at least one processor includes means for transmitting to the debug circuit a signal indicating that a current process identifier value differs from a processor identifier value of a previously-executed instruction.

12. A microcomputer according to claim 8, wherein the debug circuit includes means for storing the program counter of the at least one processor in a memory-mapped register.

13. The microcomputer according to claim 12, wherein the debug circuit includes the memory-mapped register.

14. The microcomputer according to claim 8, wherein the at least one processor includes means for transmitting to the debug circuit a value indicating the program counter of the at least one processor has incremented; and
   wherein the at least one processor includes means for transmitting to the debug circuit a value indicating an amount by which the program counter is incremented.

15. A method for transferring information between a processor and a debug circuit of a microcomputer, the processor and debug circuit being implemented on a same integrated circuit, the method comprising steps of:
   transmitting, in real time to the debug circuit on a communication link coupling the processor and the debug circuit, a program counter value indicating the program counter of the processor;
   wherein the program counter value has a value corresponding to a value of the program counter at a writeback stage of a pipeline of the processor; and
   the method further comprising a step of transmitting to the debug circuit on the communication link a status signal indicating that a computer instruction in the writeback stage is a valid computer instruction, the status signal comprising at least one bit.

16. The method according to claim 15, the method further comprising a step of transmitting to the debug circuit a status indicating that the computer instruction in the writeback stage is a first instruction past a branch instruction.

17. The method according to claim 15, the method further comprising a step of transmitting to the debug circuit a process identifier value.

18. The method according to claim 15, the method further comprising a step of transmitting to the debug circuit a signal indicating that a current process identifier value differs from a processor identifier value of a previously-executed instruction.

19. The method according to claim 15, the method further comprising a step of storing the program counter of the processor in a memory-mapped register of the debug circuit.

20. The microcomputer according to claim 19, wherein the debug circuit includes the memory-mapped register.

21. The method according to claim 15, the method further comprising a step of transmitting to the debug circuit a value indicating the program counter of the processor has incremented; and the method further comprising a step of incrementing the program counter by a value depending upon a mode signal.

* * * * *